June 25, 1946.   L. H. LOGUE   2,402,649
SETTLING METHOD AND APPARATUS
Filed Jan. 26, 1937   3 Sheets-Sheet 3

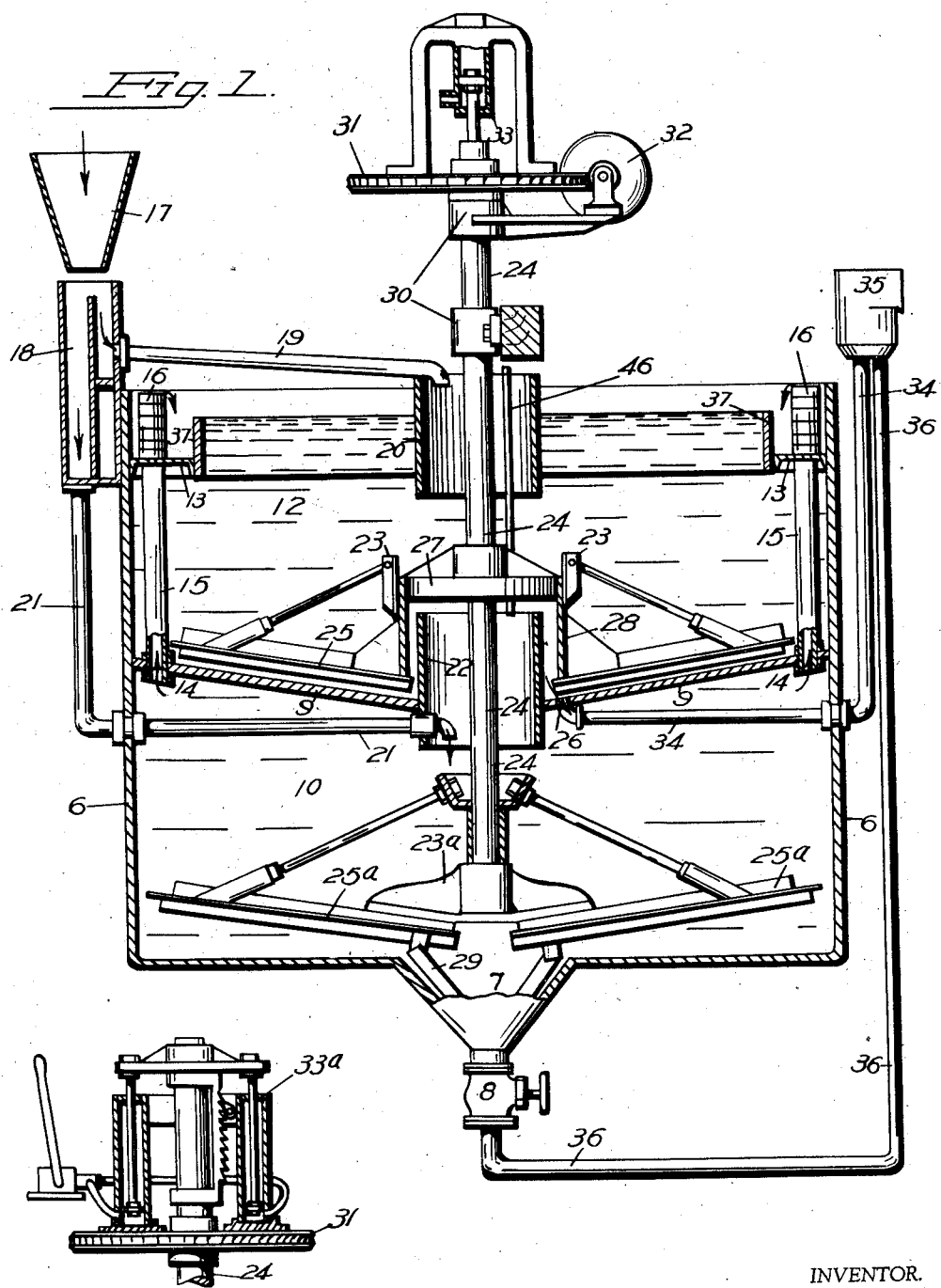

INVENTOR.
LELAND H. LOGUE
BY
ATTORNEY.

Patented June 25, 1946

2,402,649

UNITED STATES PATENT OFFICE 2,402,649

SETTLING METHOD AND APPARATUS

Leland H. Logue, Denver, Colo., assignor, by mesne assignments, to Mining Process and Patent Company, a corporation of Delaware Application January 26, 1937, Serial No. 122,371

9 Claims. (Cl. 210—55)

My invention relates to tray thickeners, and more particularly to thickener apparatus in which two or more trays are located in a single tank for conjoint operation.

It is a primary object of the present invention to provide a positive, fluid seal between the tray and the portion of the tank therebelow whereby to prevent any of the material under treatment in the tray escaping into the tank.

Another object of the invention is the provision of a multiple tray thickener construction particularly adapted for a washing operation.

A further object is the creation of a pressure zone in a thickener tank acting on material under treatment for controlling the discharge of the same.

Other objects reside in novel details of construction and novel combinations and arrangements of parts all of which will appear more fully in the course of the following description.

The thickening operation, sometimes known as the continuous gravity settling process involves the settling of solid constituents of the material under treatment out of the liquid in which they are suspended for their removal in thickened condition through an outlet in the container, while the clarified liquid rising out of the thickened matter is removed by overflow.

In the operation, settling solids thickened to a predetermined, regulatable degree of density and the clarified liquid are separately discharged in a continuous operation from the tank in which the separation process is carried on.

Essentially, my invention consists of a tank having a succession of superposed settling areas, means for feeding material to said areas, means for discharging the solids settling upon the areas in a thickened condition, and means for the automatic discharge of clarified liquid above the settling areas.

There are also associated with the above-enumerated essential features, devices for regulating the feed of material to the different settling areas, means for controlling the discharge of the thickened matter, and mechanism for moving the settling solids to the points of their discharge.

My invention also contemplates the creation of pressure zones in the areas of the tank immediately beneath each tray to prevent passage of material between successive areas in order that each such area may function as a complete and independent thickener.

It will be understood from the foregoing description that by the use of my invention the capacity of settling apparatus of the type mentioned is increased materially with a comparatively small advance in the cost of operation and without enlarging the superficial area of the container in which the process is performed.

To afford a better understanding of the invention reference will now be made to the accompanying drawings in the several views of which like parts have been designated similarly, and in which:

Figure 1 is a vertical section through a thickening apparatus embodying the features of the present invention;

Figure 2 is a vertical section through a modified form of hydraulic lifting device with which the thickening apparatus illustrated, is equipped;

Figure 3:
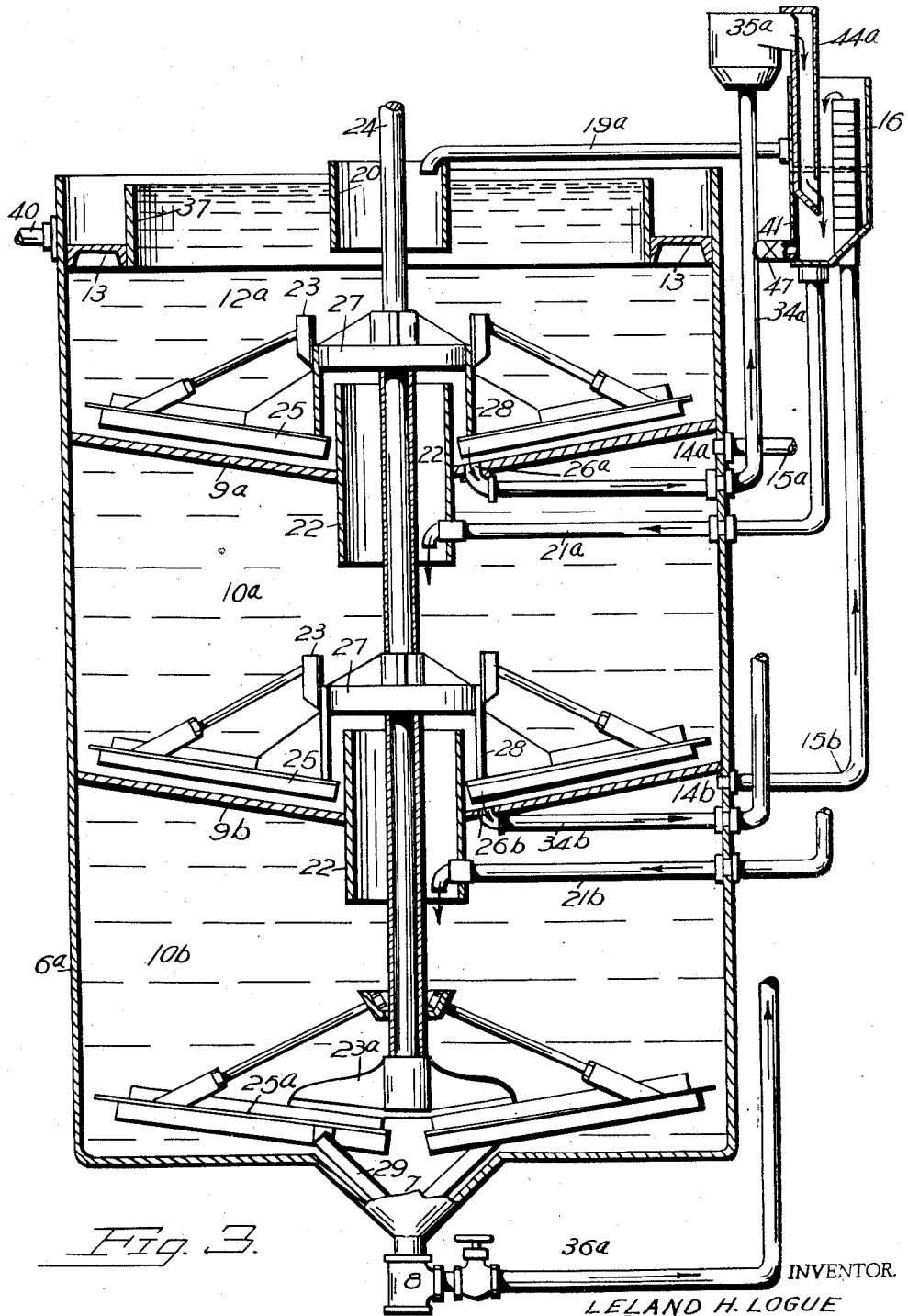
Figure 3 is a vertical section through another embodiment of thickening apparatus incorporating the features of the present invention.

Referring first to Figure 1, the reference numeral 6 designates a tank, preferably cylindrical and provided with a sump 7 in its bottom, preferably in the form of a cone, in communication with a valve-controlled outlet 8. A dished partition 9 adjoining the inner circumferential surface of the tank 6 divides the same into a lower compartment 10 and an upper compartment 12 which provides the supplemental settling surface of the apparatus.

The tank is provided at its upper end with a peripheral launder 13 for the reception of clarified liquid rising from the solids settling in the tank, and it has connecting with the apex of an annular pocket 14 formed beneath the conical partition 9, in which the clarified liquid rising in the lower compartment accumulates, a discharge conduit 15 which extends through partition 9 and launder 13, the flow through which is controlled by the provision of a column of rings 16 that may be increased or decreased in number to vary the height of the overflow discharge.

Material under treatment is fed into the tank through the intermediary of a feed box 17 discharging into a conventional-type splitter 18, which proportions the feed substantially equally. In order to create pressure in the lower compartment 10, as will be explained hereinafter, it is necessary that the head of the liquid column in splitter box 18 be as high or higher than the discharge across rings 16. One part of this feed passes through a conduit 19 into a feed well 20 in compartment 12 while the other part of the feed passes through a conduit 21 and discharges into a feed well in compartment 10.

The partition 9 is centrally apertured and a tube 22 is fitted therein with a portion of the same extending into the compartment 10 and serves as the feed well. The remainder of the tube 22 extends upwardly into compartment 12 and terminates adjacent and spaced from a spider 23 mounted on a shaft 24 and carrying rakes 25 which move the thickened matter along the upper surface of partition 9 to a point of discharge 26.

The spider 23 comprises a central hub 27 in the form of a disk, carrying a collar 28 at its periphery which is fitted upon the upper surface of the rakes 25. This collar is spaced from and in proximity to the tube 22, the tube, spider and collar together forming a labyrinth-type seal as will be explained hereinafter.

A second spider 23a is mounted on shaft 24 in compartment 10 and carries rakes 25a and sump scrapers 29 for moving settled solids in compartment 10 into and through sump 7.

The shaft 24 is supported in suitable bearings 30, and carries at its upper end a gear 31 driven by a motor 32 or any other suitable means. There is also provided a hydraulic lifting device 33 acting on the shaft 24 to raise and lower the rakes 25 and 25a when required. In Figure 2, another form of the lifting device has been indicated by reference numeral 33a, but since the same forms no part of the present invention and has been illustrated merely to show an operative assembly of parts, detailed description of its construction appears unnecessary.

The settled solids depositing onto partition 9 are directed against the tube 22 by the slow rotary movement of rakes 25 over its dished surface, and these solids then move through the discharge outlet 26 into a conduit 34 and are carried through the same to an elevated point of discharge by a pump 35.

A diaphragm pump of the type described and claimed in U. S. Letters Patent Number 2,031,609, granted to me February 25, 1936, is well suited for this purpose. Preferably the pump 35 is of the duplex type, and settled solids passing through the valve-controlled discharge 8 are elevated to a second compartment of the same (not shown) through a conduit 36 in connection therewith.

During operation, compartment 10 is maintained under hydrostatic pressure through the provision of the discharge from conduit 15 at a higher elevation than the overflow of clarified liquid in compartment 12 determined by overflow weir 37.

The elevation of the point of discharge from conduit 15 is initially determined with relation to the density of the material treated in the tank. The rings 16 are of different thickness and any desired elevation for the point of discharge can be attained by proper selection of the rings.

The pressure created in the lower compartment is maintained substantially constant therein for a given overflow setting by reason of the fact that it balances the pressure of the thickened solids in the tray exerted on the contents of the passage between the compartments. The pulp at the tray discharge is under sufficient pressure because of the increased density of the thickened solids and the restricted character of the passage into which it is moved to prevent any escape of matter from compartment 10 by way of the tray discharge, and an equilibrium is established which functions with feed well 22, collar 28 and spider 27 to create the labyrinth type seal aforementioned.

As a result of the foregoing, each of the compartments functions as a separate and independent thickener tank, in which the density of material under treatment is closely controlled through the elimination of accidental dilution due to short circuiting.

The compartments 10 and 12 operate conjointly by reason of the common rotary shaft 24 on which the rakes 25 and 25a are carried. The provision of the overflow conduits for the elevation of clarified liquid within the tank, eliminates overflow boxes attached to the outside of the tank, which is conventional in structures of this type, thereby reducing the superficial area of a tank of a given capacity.

Thickener tanks are frequently operated in series in a washing operation, and tray thickeners are sometimes used for this purpose. By having a number of trays in a single tank, a relatively large capacity can be utilized in a relatively small space within a mill or other building in which the thickening operation is performed.

Figure 4:
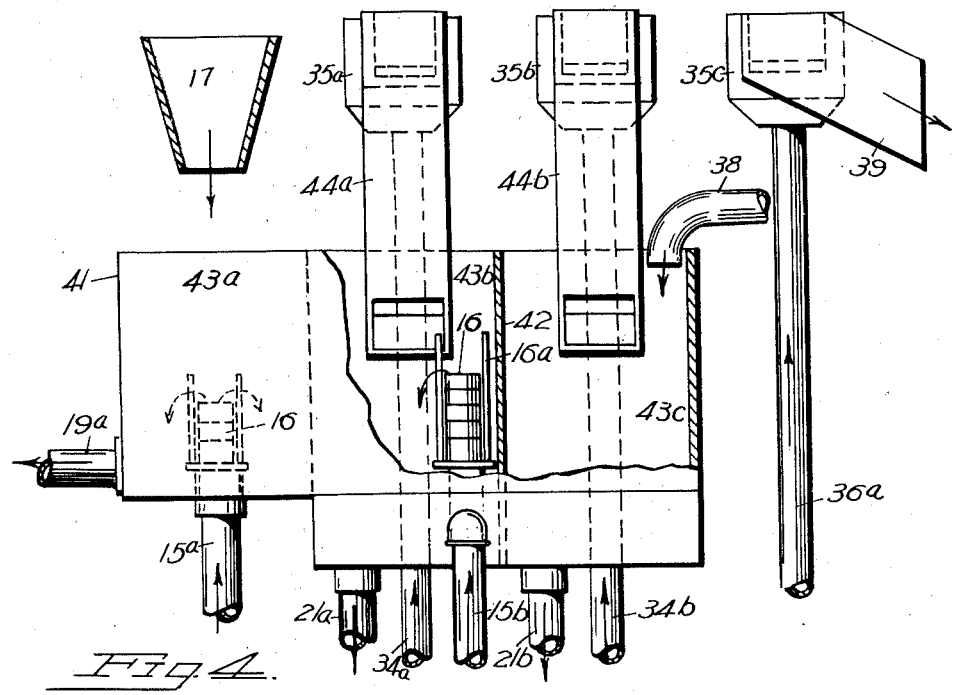
Figure 4 is a fragmentary elevation, partially in section of the fluid circulating system of the apparatus illustrated in Figure 3.
Figure 5:
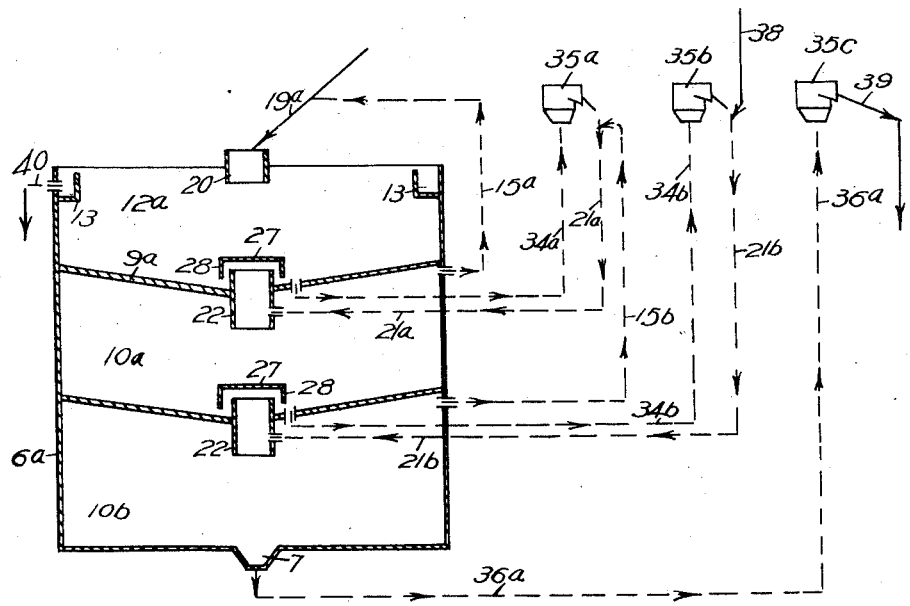
Figure 5 is a flow sheet illustrating the operation of the fluid circulating system of the apparatus illustrated in Figure 3.

Figures 3 and 4 illustrate apparatus designed for this purpose and Figure 5 is a flow sheet illustrating the operation of the apparatus of Figures 3 and 4.

In this embodiment of my invention, the tank 6a is relatively deep and contains a plurality of trays or partitions 9a and 9b of the same type as the partition 9 of Figure 1. The number of trays may be varied according to treatment requirements, as many as 6 or 7 in a single tank being feasible under proper conditions.

In the illustrated embodiment, the trays 9a and 9b divide the tank into three compartments 12a, 10a and 10b respectively, and a peripheral launder 13 is located at the top of tank 6a to receive the clarified liquid overflowing the weir 37.

A rotary shaft 24 carries scrapers 25 and 25a in the different compartments, the rakes 25 being part of a spider assembly 23 previously described, and located in compartments 12a and 10a, while rakes 25a are carried by a spider 23a in compartment 10b and are the same type as described hereinabove. Sump scrapers 29 are connected with rakes 25a for conjoint operation.

In this embodiment, the compartments 10a and 10b are maintained under pressure, and the fluid seal feature is utilized to constitute each compartment a separate and distinct thickener tank in the manner hereinbefore described.

In the washing operation, the circulatory movement of fluids differs somewhat from that hereinbefore described, and will be explained in detail in connection with the flow sheet, Figure 5.

Feed is introduced into feed well 20 of compartment 12a, mixed with clarified liquid drawn from pocket 14a through conduit 15a and delivered into conduit 19a which supplies feed well 20.

The thickened product in compartment 12a is moved by rakes 25 to the discharge outlet 26a and is drawn through conduit 34a into pumps 35a, from which it is discharge and mixed with clarified liquid drawn from pocket 14b in compartment 10b through a conduit 15b to an elevated point of discharge.

This mixture of settled solids and clarified liquid is then delivered through conduit 21a into the feed well 22 of compartment 10a and serves as the feed of the second treatment. The settling solids in this compartment are moved by rakes 25 to the discharge outlet 26b and elevated through a conduit 34b by a pump 35b from which they are discharged.

Clear water or wash liquid of suitable character from any suitable source, here indicated as a conduit 38, is mixed with the discharge from pump 35b and this mixture is delivered by a conduit 21b into the feed well 22 of compartment 10b, where it is subjected to the final treatment. Settling solids in this compartment are moved by the rakes 25a into sump 7, where they are moved by scrapers 29 to the valve-controlled outlet 8 and are elevated through conduit 36a by pump 35c from which they pass as a final discharge of the thickening operation into a launder 39.

It will be observed that in this washing operation, clarified liquid from the next succeeding compartment is mixed with the settled solids from the next preceding compartment to furnish the feed to any given compartment, and in the last compartment of the series, clarified liquid for the feed mixture must be furnished from some outside source, as a storage tank, for example. Likewise the feed to the first comprises a mixture of clarified liquid from the second compartment with solids or solids in liquid from an outside source.

The foregoing arrangement permits any number of trays from two to seven to be employed in the washing operation as previously described.

It will be noted that with this arrangement, there is only one final discharge of clarified liquid, and one final discharge of settled solids, which in the flow sheet Figure 5 are exemplified by the reference numerals 40 and 39 respectively.

The various mixings of thickened material with clarified liquid, in ore treatments in particular, may be utilized to release values entrapped in the thickened solids. The density of the material under treatment is controlled at each stage of the operation to the end that the final solids discharge at 39 is a product from which substantially all values have been removed, while the liquid discharged at 40 comprises a liquid body enriched in values which may be recovered readily by any suitable method of separation, such as precipitation.

The density is here illustrated as controlled by the pumps 35, and it will be understood that any other density control means may be used within the spirit and scope of the invention.

It is essential to the proper functioning of the apparatus illustrated in Figure 3 that each of the compartments below compartment 12a is maintained under pressure, and due to the changing hydrostatic head, each compartment successively lower in the series will require an increase in pressure for establishing the desired equilibrium.

This result is attained by increasing the overflow level at which the clarified liquid from such compartment is discharged. In Figure 4 this feature has been illustrated. A distributor box 41 is supported adjacent tank 6a at any convenient location determined by plant requirements, and is divided by partitions 42 into a plurality of chambers 43 corresponding in number to the compartments of tank 6a.

For convenience in description, these chambers will be designated 43a, 43b and 43c, being respectively the first, second and final distributor of the system illustrated.

The operation of the distributor 41 is as follows:

An original feed from any suitable source (not shown) is directed by feed box 17 into chamber 43a, and clarified liquid from compartment 10a of tank 6a is discharged across a weir defined by rings 16 supported at the upper end of conduit 15a.

These materials are mixed in chamber 43a and discharge therefrom through conduit 19a and become the feed of compartment 12a in tank 6a.

Clarified liquid from compartment 10b enters chamber 43b across a weir defined by a series of rings 16 at the upper end of conduit 15b. A convenient form of ring support has been indicated by the reference numeral 16a in chamber 43b.

The pump 35a is located adjacent chamber 43b and a discharge chute 44a conducts matter discharged from the pump into compartment 43b where it mixes with the clarified liquid and then passes through conduit 21a into the feed well 22 of compartment 10a.

In compartment 43c, settled matter from pump 35b is delivered through a chute 44b, and a conduit 38 supplies clear water or any other suitable liquid from a source of supply such as a storage tank (not shown).

The settled matter and liquid is mixed in chamber 43c and then passes through conduit 21b to feed well 22 of compartment 10b.

In many instances it will be desirable for convenience in assembly and operation, to have a third pump 35c adjacent the pumps 35a and 35b. Such an arrangement has been illustrated in Figure 4 in which the pump 35c elevates thickened matter passing through sump outlet 8 into conduit 36a. Matter discharged from pump 35c falls into launder 39 and passes to any suitable point of storage or disposal (not shown).

It will be understood that the final solids discharge may be at any convenient location, and the elevated discharge illustrated is merely an arrangement frequently employed. The present invention contemplates variation in the point of discharge and the illustrated form is not intended as a limitation in the scope of the invention.

In the several views of the drawings, the clarified liquid discharge has been shown as controlled by a series of rings 16. While this is a simple and convenient structural arrangement, it will be understood that any structure that will permit changes in elevation of the discharge, or which will otherwise permit control of pressures within the tank, may be employed in place of the rings 16.

The essential feature is that the various compartments below the trays are at all times subjected to a controlled pressure which may be varied precisely by the operator in accordance with changing requirements.

Likewise, the pumps used for elevating the thickened matter, the driving means for rotation of the shaft 24 and the lifting device for changing the elevation of the rakes in the respective compartments may be changed within the spirit and scope of the invention. The lifting device is a non-essential feature which is advantageous but not essential to the operation. The motor-driven worm has proven an effective means for operating rakes in tray-thickeners, but other power sources may be utilized when desired.

While an adjustable stroke diaphragm pump of the type described has been suggested as an effective means of performing the stated functions, any type of pump which will effectively elevate the settled matter, will be satisfactory for purposes of the present invention.

The tray thickener illustrated in Figure 3 is particularly suited for washing operations in ore treatments, but it will be understood that each embodiment of the tray thickener described and claimed herein, may be used in all treatments in which devices of this general type are employed.

Under certain conditions the cascading action of the feed of solids and liquids to the various chambers 43, may fail to produce the desired mixing. In such event, connection is made between the mixing chamber and the suction side of a pump 35 whereby a portion of the mixed material in the chamber is recirculated through the pump and subjected to an intense agitation by the action of the pump.

Such an arrangement has been illustrated in Figure 3 in which a valve-controlled conduit 47 extends from mixing chamber 43b to conduit 34a. A valve or similar control means may be used when the operation is to be intermittent, and if continuous recirculation is desired, the control means may be omitted.

In supplying feed to the various chambers of the apparatus air will usually be entrained in the pulp, which interferes with the subsequent treatment of the same. To meet this condition, there is provided an air-vent 46 extending from any lower compartment 10, 10a or 10b through the upper compartment 12 to a point of discharge in the atmosphere above the liquid level in compartment 12. Such an arrangement has been illustrated in Figure 1, and is of general application where more than one tray is contained in a single tank.

Changes and modifications may be availed of within the spirit and scope of the invention as defined in the hereunto appended claims.

What I claim and desire to secure by Letters Patent is:

1. A system for settling solids from fluid suspensions, comprising a tank, a series of superposed settling compartments therein, a distributor divided into mixing chambers in corresponding relation to the settling compartments in the tank, a feed inlet in one of the distributor chambers, a conduit for delivering clarified liquid from one of the tank compartments to said chamber, a conduit for delivering mixed material from said chamber to the uppermost tank compartment, means for delivering settled solids from the uppermost tank compartment to a second distributor chamber, a conduit for supplying clarified liquid from another tank compartment to the second chamber, a conduit for delivering mixed material from the second chamber to an intermediate tank compartment, means for delivering settled solids from an intermediate tank compartment to a third distributor chamber, means for supplying a wash liquid to the third chamber, and a conduit for delivering mixed material from the third chamber to the lowermost tank compartment, the tank having a settled solids outlet in the lowermost compartment and having an overflow for clarified liquid in the uppermost compartment.

2. A method of treating a liquid-solids suspension, which comprises establishing a plurality of superposed and physically communicating settling zones; removing settled solids from the lower portion of each zone; removing clarified liquid from the upper portion of each zone; establishing a pressure seal between adjacent zones to prevent movement of matter from an upper zone to the next lower zone mixing clarified liquid from a lower zone and settled solids from an upper zone, and feeding such mixture to an intermediate zone; mixing incoming wash liquid and settled solids from a zone above the lowermost zone, and feeding such mixture to the lowermost zone; and mixing clarified liquid from a lower zone with the incoming solids, and feeding such mixture to the uppermost zone.

3. The combination with apparatus for washing solids in liquids, of a mixing chamber for the supply of a fluent body of solids in liquids to such apparatus, a feed conduit extending from the chamber to the apparatus for delivering a mixture of solids and liquids thereto, a return conduit, inclusive of a pump, for the delivery of thickened solids from the apparatus to the mixing chamber, means for introducing a body of liquid into said chamber, and conducting means connecting the feed conduit with the return conduit on the suction side of the pump, to induce additional mixing of the solids and liquids by the action of the pump.

4. The combination with apparatus for washing solids in liquids, of a mixing chamber for the supply of a fluent body of solids in liquids to such apparatus, a feed conduit extending from the chamber to the apparatus for delivering a mixture of solids and liquids thereto, a return conduit, inclusive of a pump, for the delivery of thickened solids from the apparatus to the mixing chamber, means for introducing a body of liquid into said chamber, and valve-controlled conducting means connecting the feed conduit with the return conduit on the suction side of the pump to induce additional mixing of the solids and liquids by the action of the pump.

5. In an apparatus for treating a liquid-solids suspension, a tank structure divided into superposed compartments and comprising a lower compartment and an upper compartment vertically superposed immediately above the lower compartment, each compartment adapted to have a sludge bed formed therein from the settling solids and having means for overflowing supernatant liquid, conduit means constituting a passage from the upper to the lower compartment and adapted in the normal operation of the apparatus to have trapped therein a substantially stationary body of settled solids, means including a plurality of conduits constructed and arranged to mix a solids body to be treated with a wash liquid and to feed said mixture to the upper compartment, means for withdrawing settled solids material from the bottom of said upper compartment, and means constructed and arranged to add a liquid diluent to said withdrawn solids and to feed said mixture to said lower compartment.

6. In an apparatus for treating a liquid-solids suspension, a tank structure divided into superposed compartments and comprising an upper compartment, an intermediate compartment and a lower compartment all vertically superposed immediately one above the other, each compartment adapted to have a sludge bed formed therein from the settling solids and having means for overflowing supernatant liquid, conduit means between each two adjoining compartments constituting passages from the upper to the intermediate compartment and from the intermediate to the lower compartment respectively, each such passage adapted in the normal operation of the apparatus to have trapped therein a substantially stationary body of settled solids, means including a plurality of conduits constructed and arranged to mix a solids body to be treated with a wash liquid and to feed said mixture to the upper compartment, means for withdrawing settled solids from the upper compartment to a point outside the tank, means outside the tank for mixing the settled solids withdrawn from the upper compartment with overflowing supernatant liquid from the lower compartment, means for introducing said mixture into the intermediate compartment, means for withdrawing settled solids from the intermediate compartment to a point outside the tank, and means for introducing said settled solids withdrawn from the intermediate compartment and a liquid diluent into the lower compartment.

7. The improvement in countercurrent washing of solids and liquids in metallurgical treatments, which comprises subjecting a mixture of solids in liquids to gravity settling treatments in successive stages subject to a common hydrostatic pressure, removing settled solids from each of the stages beyond the zone of common hydrostatic pressure, intimately intermixing the solids so removed at the various stages other than the last in the series with a clear liquid, removing clarified liquid from each of the stages other than the first in the series to an elevated point of discharge by the hydrostatic pressure, utilizing the clarified liquid so discharged as the liquid of the intimate intermixture, and returning the intimate intermixture as the feed to one of said stages, the feed to the first stage of the series comprising clarified liquid from the second stage intimately intermixed with an original feed, the feed to the last stage of the series comprising clear liquid from an external source in intimate intermixture with the solids removed from the next preceding stage and the feed to any stage intermediate thereof comprising a mixture of settled solids from the next preceding stage with clarified liquid from the next succeeding stage.

8. Apparatus for treating a liquid-solids suspension, including a plurality of superposed settling compartments; means for removing settled solids from the lower portion of each compartment; means for removing clarified liquid from the upper portion of each compartment; means for mixing clarified liquid from a lower compartment and settled solids from an upper compartment, and feeding such mixture to an intermediate compartment; means for mixing settled solids from a compartment above the lowermost with a liquid supply, and feeding such mixture to the lowermost compartment; and means for mixing incoming solids with clarified liquid from a lower compartment, and feeding such mixture to the uppermost compartment.

9. In apparatus for treating a liquid-solids suspension, means for establishing a plurality of superposed settling zones; means for removing clarified liquid from a lower zone; means for mixing such liquid with incoming solids at a point removed from the uppermost zone; and means for feeding such mixture to said uppermost zone.

LELAND H. LOGUE.